(12) United States Patent
Sridhar et al.

(10) Patent No.: US 11,598,273 B2
(45) Date of Patent: Mar. 7, 2023

(54) RATE CONTROL ALGORITHM HAVING A TRAINED ALGORITHMIC MODEL FOR OPTIMIZING FUEL DISTRIBUTION

(71) Applicant: Halliburton Energy Services, Inc., Houston, TX (US)

(72) Inventors: Srividhya Sridhar, Bellaire, TX (US); Jie Bai, Katy, TX (US); Ubong Akpan Inyang, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 98 days.

(21) Appl. No.: 17/350,990

(22) Filed: Jun. 17, 2021

(65) Prior Publication Data
US 2022/0403720 A1  Dec. 22, 2022

(51) Int. Cl.
*F02D 41/30* (2006.01)
*F02D 29/04* (2006.01)
*G06K 9/62* (2022.01)
*E21B 43/26* (2006.01)
*F02D 41/00* (2006.01)

(52) U.S. Cl.
CPC .......... *F02D 29/04* (2013.01); *E21B 43/2607* (2020.05); *F02D 41/0025* (2013.01); *G06K 9/6256* (2013.01)

(58) Field of Classification Search
CPC .. F02D 41/3082; F02D 41/0025; F02D 29/04; G06K 9/6256; E21B 43/2607

USPC .......... 123/299, 300, 27 GE, 525, 495–499; 701/103–105
See application file for complete search history.

(56) References Cited

U.S. PATENT DOCUMENTS

| | | |
|---|---|---|
| 7,093,588 B2 | 8/2006 | Edwards |
| 9,027,538 B2 | 5/2015 | Lepley |
| 9,309,819 B2 | 4/2016 | Norton |
| 9,371,789 B2 | 6/2016 | Rosswurm et al. |
| 9,683,499 B2 | 6/2017 | Stephenson et al. |
| 10,113,493 B2 | 10/2018 | Atterberry et al. |
| 10,570,835 B2 | 2/2020 | Lavertu et al. |

*Primary Examiner* — Hai H Huynh
(74) *Attorney, Agent, or Firm* — Barnes & Thornburg, LLP (57) ABSTRACT

A system comprising engine driven pumps, control units, a rate control algorithm, and a trained algorithmic model. The control units store operation variables for the engine driven pumps. The rate control algorithm includes an instruction set to read the operation variables for the engine driven pumps. The instruction set comprises a trained algorithmic model with a parameter space based on historical operation variables. The trained algorithmic model determines an optimal distribution rate based on an objective. The instruction set generates rate control variables based on the determined optimal distribution rate. Each rate control variable comprises a selected control unit identifier and a rate value. The instruction set distributes each rate control variable based on the selected control unit identifier. The trained algorithmic model determine the optimal distribution rate using an objective that defines a desired mixture between a first fuel and a second fuel.

20 Claims, 5 Drawing Sheets

RATE CONTROL ALGORITHM HAVING A TRAINED ALGORITHMIC MODEL FOR OPTIMIZING FUEL DISTRIBUTION

BACKGROUND

Single and dual fuel engine driven pumps are used to pump stimulation fluids into wells during a fracturing operation. Dual fuel engine driven pumps are preferred since these types of engines reduce greenhouse gas emissions. The engines utilize diesel fuel or a combination of natural gas and diesel. In the case of dual fuel engine driven pumps, the theoretical maximum substitution rate is about 70% natural gas for diesel. Typically, during a stimulation operation, an operator operates these pumps using his/her prior experience of running conventional diesel pumps. However, a stimulation operation can comprise an fleet of engine driven pumps configured with a combination of single and dual fuel type engines or entirely of dual fuel type engines. In these types of configurations, manual intervention doesn't result in optimal substitution for a fleet of pumps. Distributing rates manually to pumps to maximize gas substitution in a wide variety of operating conditions and constraints, and to be consistent, is very challenging.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

As previously stated, during a fracturing operation using a plurality of pumps that may be a combination of single fuel engine driven pumps and dual fuel engine driven pumps or entirely dual fuel engine driven pumps, it is nearly impossible to optimize pump flow rates for engine driven pumps through manual intervention. Algorithmic models have been developed to help an operator select pump flow rates for individual engine driven pumps while considering operational parameters, such as pressure, pump flow rate, and engine parameters, such as horsepower and gear. Although the algorithmic models are an improvement over manual intervention, optimal pump flow rates are not sufficiently optimized since the algorithmic models consider every engine and pump to be the same when distributing rates. Furthermore, these algorithmic models also do not consider several other factors that affect pump flow rate distribution, such as left and right air filter conditions (for dual fuel engine driven pumps), engine hours, pump hours, etc.; which are unique to each individual pump, irrespective of make and model.

Presented herein is an apparatus comprising at least one control unit and a rate control algorithm having an instruction set with a trained algorithmic model. The at least one control unit processes and stores operation variables for at least one engine driven pump. The instruction set reads operation variables for the at least one engine driven pump. The trained algorithmic model includes a parameter space based on historical operation variables. The trained algorithmic model determines an optimal distribution rate based on an objective. The instruction set generates at least one rate control variable based on the determined optimal distribution rate. Each rate control variable comprises a selected control unit identifier and a rate value. The instruction set distributes each rate control variable based on the selected control unit identifier.

Presented herein is a system comprising at least one engine driven pump, at least one control unit, and a rate control algorithm having an instruction set with a trained algorithmic model. The at least one control unit processes and stores operation variables for at least one engine driven pump. The instruction set reads operation variables for the at least one engine driven pump. The trained algorithmic model includes a parameter space based on historical operation variables. The trained algorithmic model determines an optimal distribution rate based on an objective. The instruction set generates at least one rate control variable based on the determined optimal distribution rate. Each rate control variable comprises a selected control unit identifier and a rate value. The instruction set distributes each rate control variable based on the selected control unit identifier.

Presented here is a method for: reading operation variables for at least one engine driven pump using a computer instruction set that comprises a trained algorithmic model with a parameter space based on historical operation variables; determining an optimal distribution rate based on an objective using the trained algorithmic model; generating at least one rate control variable based on the determine optimal distribution rate, each rate control variable comprises a selected control unit identifier and a rate value; and distributing each rate control variable based on the selected control unit identifier. In some embodiments, the method can include: running at least one engine driven pump; and processing and storing operation variables for the at least one engine driven pump.

In some embodiments, the at least one control unit for processing and storing operation variables for at least one engine driven pump comprises at least one engine driven pump, at least one dual fuel engine driven pump, or any combination thereof. In some embodiments, the trained algorithmic model determine the optimal distribution rate using an objective that defines a desired mixture between a first fuel and a second fuel. In some embodiments, the trained algorithmic model determines the desired mixture between the first fuel and the second fuel using at least one control unit identifier, at least one operating value for each control unit identifier, and a subset of the historical operation variables.

In some embodiments, the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment.

In some embodiments, the historical operation variables comprise: a plurality of engine makes and models and for each make and model at least one engine emissions, at least one engine load range, at least one fluid end health, at least one split flow inputs (e.g., clean pump vs. dirty pump and associated rate limitations from fluid velocities and proppant concentrations), at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof.

In some embodiment, the instruction set: identifies a make and a model of an engine; records dates of use of the engine, age of the engine at each date of use, and associated operation variables at each date of use; generates tag variables, each tag variable having a parameter and variable for describing the make and model of the engine, each date of use of the engine, age of the engine at each date of use, and associated operation variables at each date of use; and stores the tag variables in a training data set used for training algorithmic models.

In some embodiments, the operation variables comprises an ambient temperature measurement, and the instruction generates the at least one rate control variable that restricts a minimum and maximum allowed rate for each engine driven pump or maximizes utilization of each engine driven pump.

Figure 1A:
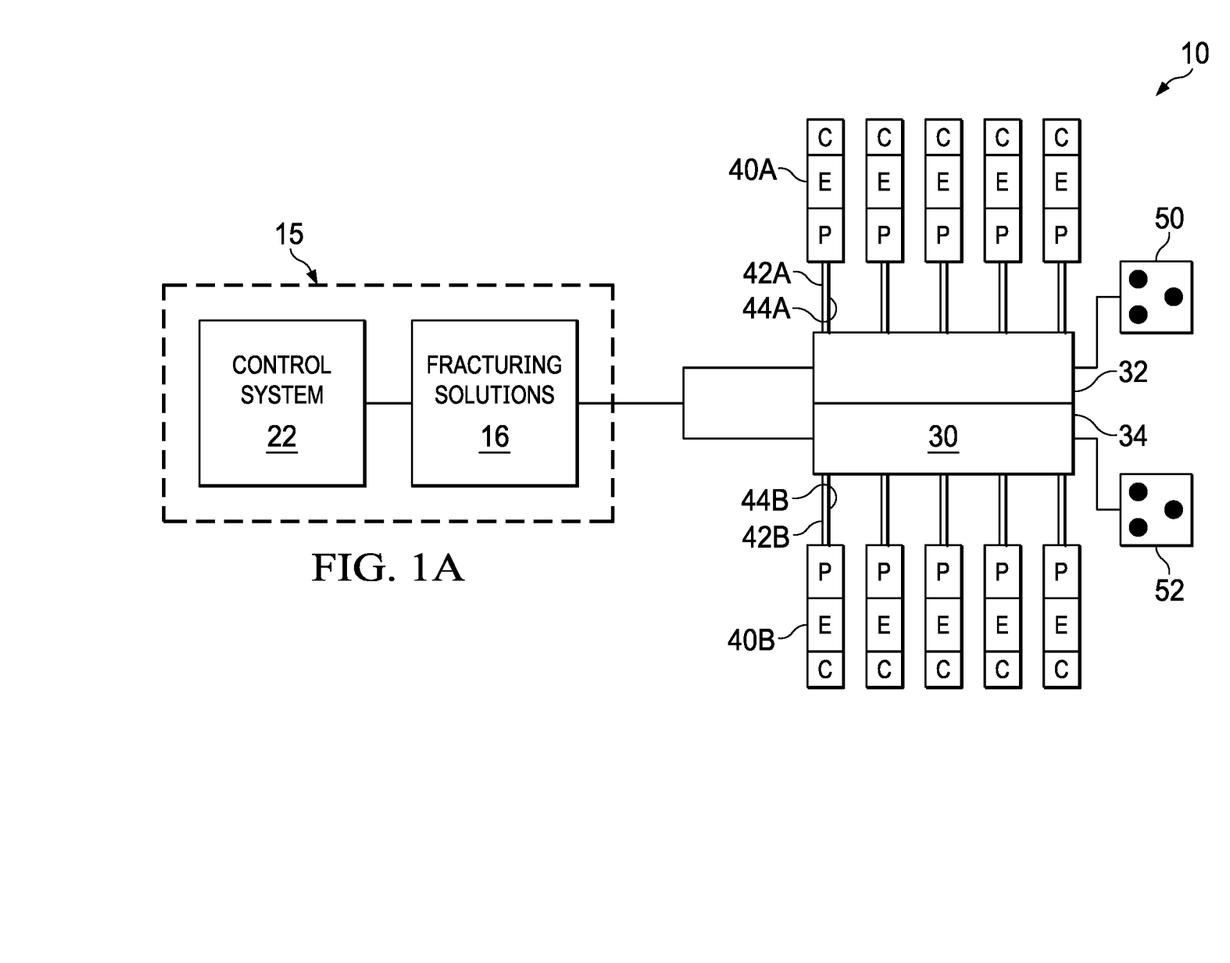
FIG. 1A is an illustration of a flow diagram of a well treatment facility that utilizes a fleet of engine driven pumps controlled by a rate control algorithm having an instruction set with a trained algorithmic model for predicting optimal fuel distribution rates, in accordance with certain example embodiments.

Referring to FIG. 1A, illustrated is a flow diagram of a well treatment facility that utilizes a fleet of engine driven pumps controlled by a rate control algorithm having an instruction set with a trained algorithmic model for predicting optimal fuel distribution rates, according to certain example embodiments, denoted generally as 10. The well treatment facility 10 comprises a fracturing solution processing center 15 mechanically and fluidly coupled to well 50 and well 52 through a manifold 30. The manifold 30 is fluidly and mechanically coupled to a first set of engine driven pumps 40a and a second set of engine driven pumps 40b. The rate control algorithm is configured to control fuel consumption between the engine driven pumps 40a, 40b for the purpose of maintaining operational constraints, maximizing fuel, such as liquefied natural gas, substitution, as well as minimizing greenhouse gas emissions.

The fracturing solution processing center 15 fluidly couples a fracturing solution 16 to the manifold 30. The fracturing solution 16 can comprise a blend of proppant, water, and various chemicals well known to those of skill in the art. The fracturing solution processing center 15 can also include a control unit (system) 22. The control unit 22 comprises various process (operation) variables, such fluid flow rate, proppant concentration, and total flow information coming out of the fracturing solution processing center 15 and proppant concentration, fluid flow rate and total flow information going into the wells 50, 52, etc. The operator or manufacture of the fracturing solution processing center 15 can determine which process variables are made available through the control unit 22.

The fracturing solution 16 can be pumped simultaneously to the first well 50 and the second well 52 through the manifold 30. The manifold 30 can be isolated into a first isolated manifold path 32 directed to the first well 50 and a second isolated manifold path 34 directed to the second well 52. The fracturing solution 16 can be transferred, transported, and/or pressurized within the first isolated manifold path 32 and the second isolated manifold path 34 through the pumps 40a, 40b. The first set of pumps 40a can be fluidly connected to the first isolated manifold path 32 via suction lines 42a and discharge lines 44a. The second set of pumps

40b can be fluidly coupled to the second isolated manifold path 34 through suction lines 42b and discharge lines 44b.

The engine driven pumps 40a, 40b comprise a pump (P), an engine (E), and a control unit (C). Each engine driven pump 40a, 40b can be the same make and model or different makes and models. The first set of engine driven pumps 40a and the second set of engine driven pumps 40a, 40b can comprise of a configuration of engine driven pumps that are operable using a single fuel, a dual fuel (such as diesel and natural gas. Sources of natural gas include but not limited to Liquefied Natural Gas (LNG), Compressed Natural Gas (CNG), or pipeline gas), bi-fuel (i.e. can run completely either on natural gas or liquid), or a combination thereof. The engine driven pumps 40a, 40b can be any commercially available pump that is typically used in the oil and gas industry. The engine driven pumps 40a, 40b include various sensors, such as various pressure sensors, temperature sensors, flow rate sensors. Regardless of how a particular manufacture configures a particular engine driven pump with monitoring devices, operation variables comprising a parameter and value identifying a type of measurement and its value is made available through the engine driven pump's control unit (C). The rate control algorithm utilizes the operation variables, the process variables, or any combination thereof and a defined objective to predict rate control variables optimized to control fuel use with the purpose of maximizing fuel substitution. Stated differently, the engine driven pumps 40a, 40b rely on the rate control algorithm and the trained algorithmic model to predict fuel distribution between the various engines in order to maintain an operator defined objective, such as overall pump flow rate and expected overall pump pressure, while maximizing fuel substitution. The rate control algorithm generates the rate control variables based on the predicted fuel distribution and distributes the rate control variables to a control unit or control units of the engine driven pumps 40a, 40b in order to control engine RPM (Revolutions Per Minute) and, therefore, pump flow rate (individual pump flow rate and overall pump flow rate).

The operation and process variables can include: engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment.

Figure 1B:
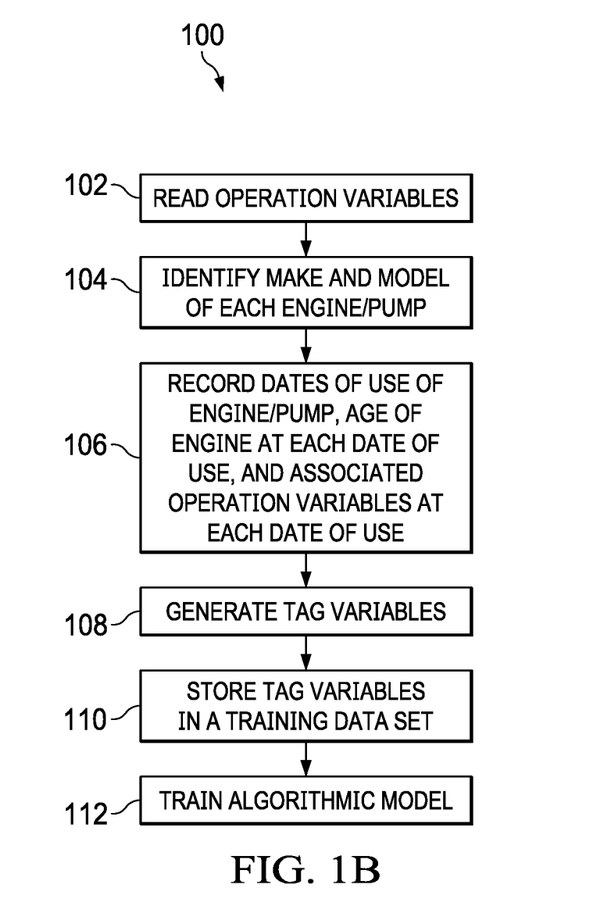
FIG. 1B is an illustration of a flow diagram of an algorithm that labels and stores operation variables from the well treatment facility for the purpose of training the algorithmic model used in the rate control algorithm for predicting optimal fuel distribution rates, in accordance with certain example embodiments.

Referring now to FIG. 1B, illustrated is a flow diagram of an algorithm that labels and stores operation variables from the well treatment facility 10 for the purpose of training the algorithmic model used in the rate control algorithm for predicting optimal fuel distribution rates, according to certain example embodiments, denoted generally as 100. The algorithm 100 uses supervised learning (classification, regression) to learn a function that maps an input (e.g. operation variable—airflow rate) to an output (operation control variable—fuel rate or rates) based on example input-output pairs (historic airflow rate, historic fuel rate or rates). The algorithm 100 infers a function (target overall pump flow rate and expected overall pump pressure) from labeled training data consisting of a set of training examples.

The algorithm 100 begins at block 102 where it reads operation variables from one or more control units (C), 22. The algorithm 100 continues at block 104 where it identifies make and model of each engine and pump. The algorithm then records dates of use of the engine, age of the engine at each date of use, and associated operation variables at each date of use, block 106. The algorithm continues at block 108 where it generates tag variables. Each tag variable includes a parameter and variable for describing the make and model of the engine, each date of use of the engine, age of the engine at each date of use, and associated operation variables at each date of use. The algorithm continues at block 110 where the tagged variables are stored in a training data set for training purposes. Once the training data set includes enough variables to train an algorithm model, the algorithm 100 generates a trained algorithmic model that infers a particular function that can be used with the rate control algorithm, block 112.

The training data set includes historical operation variables that includes: variables for different makes and models of engine and pumps for engine driven pumps and other variables from the well treatment facility 10. The variables can include a plurality of engine makes and models, engine driven pump configuration per service operation (stimulation treatment) and identifiers, and respective historic operation variables. Engine pump configuration can include total pumps, pump used for standby, and pump used for acid. The respective historic operation variables can include at least one engine emission, at least one engine load range, at least one fluid end health, at least one split flow input, at least one after treatment condition, at least one pump flow rate limitation from fluid velocity and proppant concentration, at least one critical engine fault code, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, total pump hours, total engine hours, pump hours for one or more stimulation treatments, engine hours for one or more stimulation treatments, engine rpm's during one or more stimulation treatments, one or more engine intake manifold temperatures, or any combination thereof.

Figure 2A:
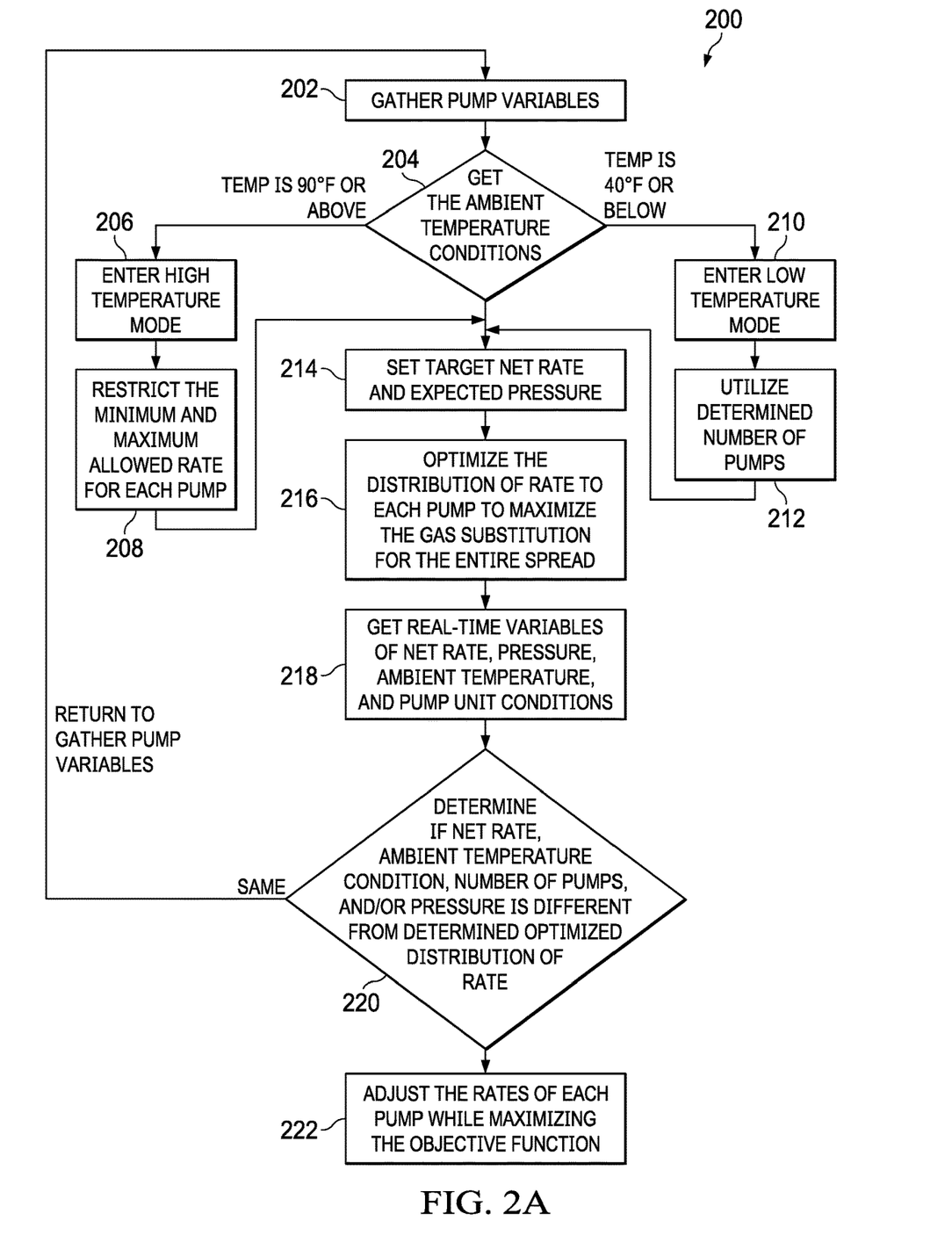
FIG. 2A is an illustration of a flow diagram of a rate control algorithm having an instruction set for predicting optimal fuel distribution rates using a trained algorithmic model and an operator defined objective, in accordance with certain example embodiments.

Referring now to FIG. 2A, illustrated is a flow diagram of a rate control algorithm having an instruction set for predicting optimal fuel distribution rates using a trained algorithmic model and an operator defined objective, according to certain example embodiments, denoted generally as 200. The rate control algorithm 200 begins at block 202 where operation variables generated by one or more control units for one or more engine driven pumps used during a service operation are read. Although the operation variables can be read in real-time during a fracturing operation, the operation variables can also be read during a pre-job or pre-treatment operation. As previously stated, the configuration of the engine driven pumps can be a combination of one or more single fuel type engine driven pumps and one or more dual fuel type engine driven pumps or one or more dual fuel type engine driven pumps or one or more single fuel type engine driven pumps. The rate control algorithm 200 is configured to manage rate distribution and, therefore, engine RPM's for a fleet of engine driven pumps. However, in practice, the configuration of the engine driven pumps can dynamically change throughout the fleet's lifecycle.

The operation variables can include parameters and values that identify each type and make of each engine driven pump within a service configuration and their respective operation variables. The respective operation variables can include: engine driven pump configuration and identifications, engine RPM's, pump flow rates, engine emissions, engine load ranges, engine jacket water temperatures, engine efficiencies, pump efficiencies, after treatment conditions, fuel types, total fuel type consumptions, total energy consumed per one or more fracturing operations, total energy consumed to date, engine knocks, engine knocks per a time period, critical engine fault code codes, split flow inputs, pump flow rate limitations from fluid velocities and proppant concentrations, total engine driven pumps, engine driven pumps used for standby, engine driven pumps used for acid, fluid end health, fuel mixture ratios, ambient temperature measurements, first fuel intake temperature measurements, first fuel intake pressure measurements, second fuel intake temperature measurements, second fuel intake pressure measurements, first fuel flow rates, second fuel flow rates, first fuel qualities, second fuel qualities, water contents of first fuel, water contents of second fuel, first air intake pressure measurements, second air intake pressure measurements, first air intake temperature measurements, second air intake temperature measurements, total pump hours, total engine hours, pump pressures, pump hours during stimulation treatments, total engine hours during stimulation treatments, engine intake manifold temperatures, and engine rpm's during a stimulation treatment.

The rate control algorithm 200 continues at block 204 where, based on ambient temperature, the rate control algorithm 200 enters into a high temperature mode, block 206, or into a low temperature mode, block 210. If the temperature is 90 degrees or above, e.g., the rate control algorithm 200 enters the high temperature mode, block 206. In the high temperature mode, the RPM or RPM's of one or more engines are restricted to a minimum and maximum allowable rate in order to limit overall pump flow rate, block 208. If the temperature is 40 degrees or below, e.g., the rate control algorithm 200 enters the low temperature mode 210. In the low temperature mode, the RPM or RPM's of one or more engines are maximized in order maximize overall pump flow rate, block 212. Stated differently, in the low temperature mode, the rate control algorithm 200 utilizes the maximum number of pumps available in order to maximize overall pump flow rate. In either case, the rate control algorithm 200 continues to block 214.

After entering into a temperature mode, as described above, or if the ambient temperature is within an acceptable range, the rate control algorithm 200 identifies an objective set, e.g., by an operator. The objective, in this particular case, is a target overall pump flow rate and expected overall pump pressure, block 214. The rate control algorithm 200 continues at block 216 where a trained algorithmic model having a parameter space based on the objective and at least one or more operation variables read in block 202 is utilized against a subset of a historical data set to predict a fuel distribution rate, see equation 1, which satisfies the objective or at least satisfies it in part. In essence, the rate control algorithm 200 uses the prediction to control the RPM of each engine driven pump to satisfy the objective (the pump flow rate, overall pump pressure, or any combination thereof) while maximizing gas substitution.

Equation 1—Fuel Distribution=f(number of engine driven pumps, configuration of engine driven pumps, net pump flow rate, expected overall pump pressure, etc.). Where f is the trained algorithmic model and the operation variables are enclosed in parenthesis. The trained algorithmic model is subject to the following constraints: minimum and maximum pump flow rate for each pump type must be maintained; ambient weather condition that further constrains an operating window for the pumps, such as maximum and minimum pump flow rate; number of pumps with non-zero pump flow rate should be less than given number of available pumps; and the summation of optimized rate distribution should be within given tolerance of target net rate. Although the algorithm optimizes for fuel distribution, other settings are also contemplated, such as an emission percent.

The historical data set can comprise historical operation variables for different makes and models of engine driven pumps. The historical operation variables can include a plurality of engine makes and models, engine driven pump configuration per service operation (stimulation treatment) and identifiers, and respective historic operation variables. Engine pump configuration can include total pumps, pump used for standby, and pump used for acid. The respective historic operation variables can include at least one engine emission, at least one engine load range, at least one fluid end health, at least one split flow input, at least one after treatment condition, at least one pump flow rate limitation from fluid velocity and proppant concentration, at least one critical engine fault code, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, total pump hours, total engine hours, pump hours for one or more stimulation treatments, engine hours for one or more stimulation treatments, engine rpm's during one or more stimulation treatments, one or more engine intake manifold temperatures, or any combination thereof.

The rate control algorithm 200 continues at block 218 where the net pump flow rate of the engine driven pumps, pump pressures (overall or individual), ambient temperature, number of engine driven pumps, and other engine driven pump unit conditions, such as engine RPM's, are determined using the operation variables read in block 202. At block 220, the rate control algorithm 200 determines if the determined net pump flow rate, pump pressures, ambient temperature, number of engine driven pumps, and engine driven pump unit conditions deviate from the predicted RPM's and the identified operation variables from the subset of the historical data set. If there is no deviation, the rate control algorithm 200 returns to block 202. If there is a deviation, the rate control algorithm 200 adjusts the RPM of one or more engine driven pumps to satisfy the prediction of the trained algorithmic model, which also satisfies the objective, block 222. Obviously, the algorithm 200 can return to block 202 to repeat the process. Although it is stated that the rate control algorithm uses a trained (supervised) algorithmic model, other algorithms can be used, such as unsupervised ML algorithmic model, physics, or any combination thereof.

Figure 2B:
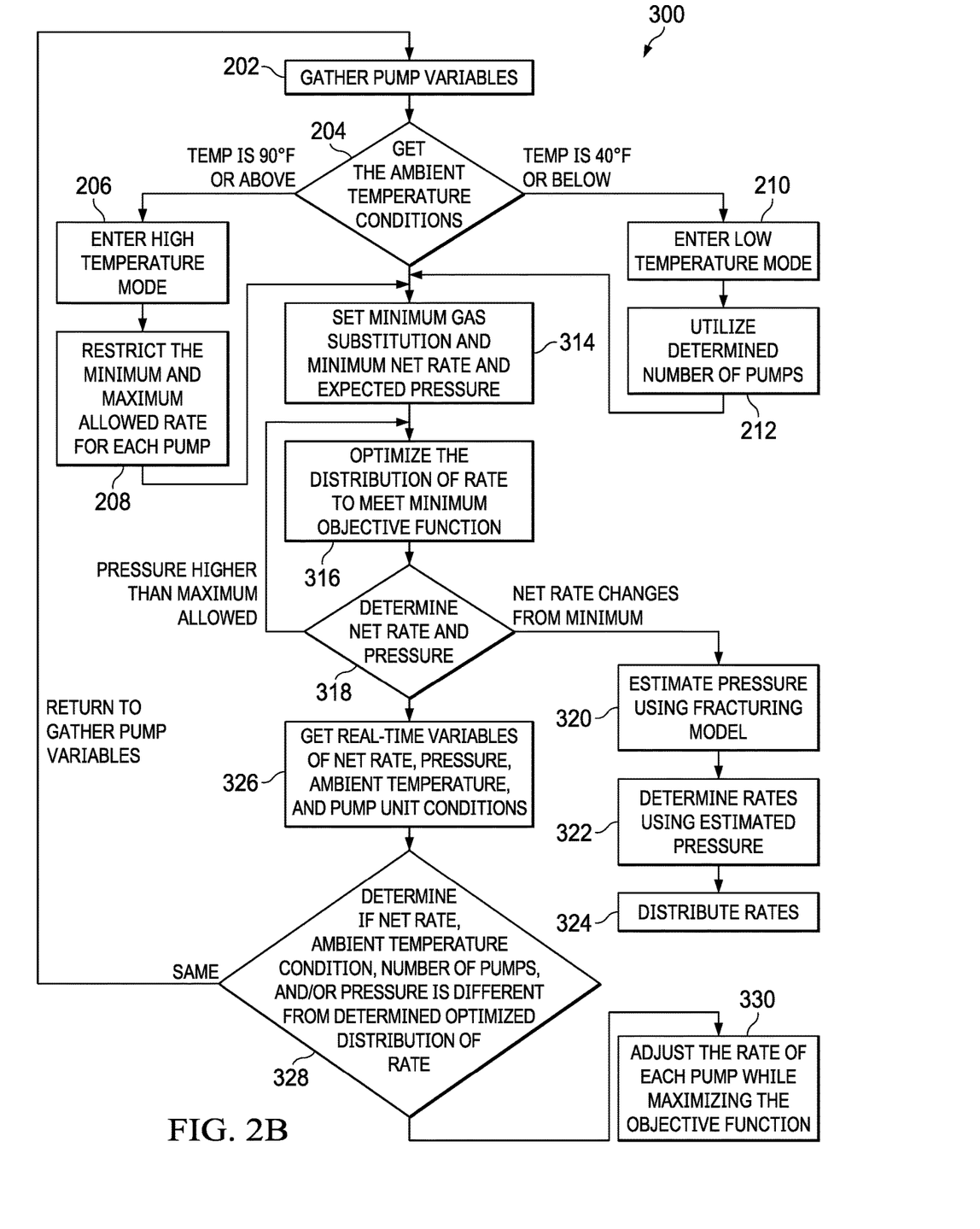
FIG. 2B is an illustration of a flow diagram of another rate control algorithm having an instruction set for predicting optimal fuel distribution rates using a trained algorithmic model and another operator defined objective and a fracturing model, in accordance with certain example embodiments.

Referring now to FIG. 2B, illustrated is a flow diagram of another rate control algorithm having an instruction set for predicting optimal fuel distribution rates using a trained algorithmic model and another operator defined objective and a fracturing model, according to certain example embodiments, denoted generally as 300. The rate control algorithm 300 includes blocks 202, 204, 206, 208, 210, and 212 which are functionally the same as those described in FIG. 2A and, as such, the descriptions for these blocks will not be repeated here.

At block 314, if the ambient temperature is within an acceptable range, the rate control algorithm 300 identifies an objective set, e.g., by an operator. The objective, in this particular case, is a minimum fuel substitution (e.g. 50% natural gas and 50% diesel), minimum net pump flow rate, and expected overall pump pressure. The rate control algorithm 300 continues at block 316 where a trained algorithmic model having a parameter space based on the objective and at least one or more operation variables read in block 202 is utilized against a subset of a historical data set to predict a fuel distribution rate, see equation 2, which satisfies the objective or at least in part satisfies the objective. In essence, the rate control algorithm 300 uses the prediction to control the RPM of each engine driven pump to satisfy the minimal fuel substitution requirement, the minimal overall pump flow rate, expected overall pump pressure, or any combination thereof.

Equation 2—Fuel Distribution=f(number of engine driven pumps, configuration of engine driven pumps, minimum gas substitution, minimum net pump flow rate, expected overall pump pressure, etc.). Where f is the trained algorithmic model and the operation variables are enclosed in parenthesis. The trained algorithmic model is subject to the following constraints: minimum and maximum pump flow rate for each pump type must be maintained; ambient weather condition that further constrains an operating window for the pumps, such as maximum and minimum pump flow rate; number of pumps with non-zero pump flow rate should be less than given number of available pumps; and the summation of optimized rate distribution should be within given tolerance of target net rate.

The rate control algorithm 300 continues at block 318 where the rate control algorithm 300 determines if the net pump flow rate change and the overall pump pressure from the predicted RPM's, net pump flow rate, and overall pump pressure satisfy certain requirements. If the predicted net pump flow rate is equal to the objective but the predicted overall pump pressure is greater than the expected overall pump pressure, the rate control algorithm 300 returns to block 316 to recalibrate in order to re-predict the RPM's, net pump flow rate, and overall pump pressure and satisfy the objective. However, if the predicted net pump flow rate changes from the set minimum net pump flow rate, the rate control algorithm 300 continues to block 320 where the overall pump pressure is estimated using a fracturing model and the predicted net pump flow rate. After estimating the overall pump pressure, the rate control algorithm 300 determines the RPM's for the fleet of engine driven pumps based on the predicted net pump flow rate, the estimated pressure, and minimal fuel substitution, block 322. The rate control algorithm 300 generates control variables and populates the variables with an RPM value and an engine driven pump identifier. The control variables are then written to a control unit of an engine driven pump, block 324.

If the net pump flow rate and the overall pump pressure satisfies the objective, the rate control algorithm 300 continues to block 326. At block 326, the net pump flow rate of the engine driven pumps, pump pressures (overall or individual), ambient temperature, number of engine driven pumps, and other engine driven pump unit conditions, such as engine RPM's, are determined using the operation variables read in block 202. At block 328, the rate control algorithm 300 determines if the determined net pump flow rate, pump pressures, ambient temperature, number of engine driven pumps, and engine driven pump unit conditions deviate from the predicted RPM's and the identified operation variables from the subset of the historical data set. If there is no deviation, the rate control algorithm 300 returns to block 202. If there is a deviation, the rate control algorithm 300 adjusts the RPM of one or more engine driven pumps to satisfy the prediction of the trained algorithmic model, which also satisfies the objective, block 330. Obviously, the algorithm 300 can return to block 202 to repeat the process.

Figure 3:
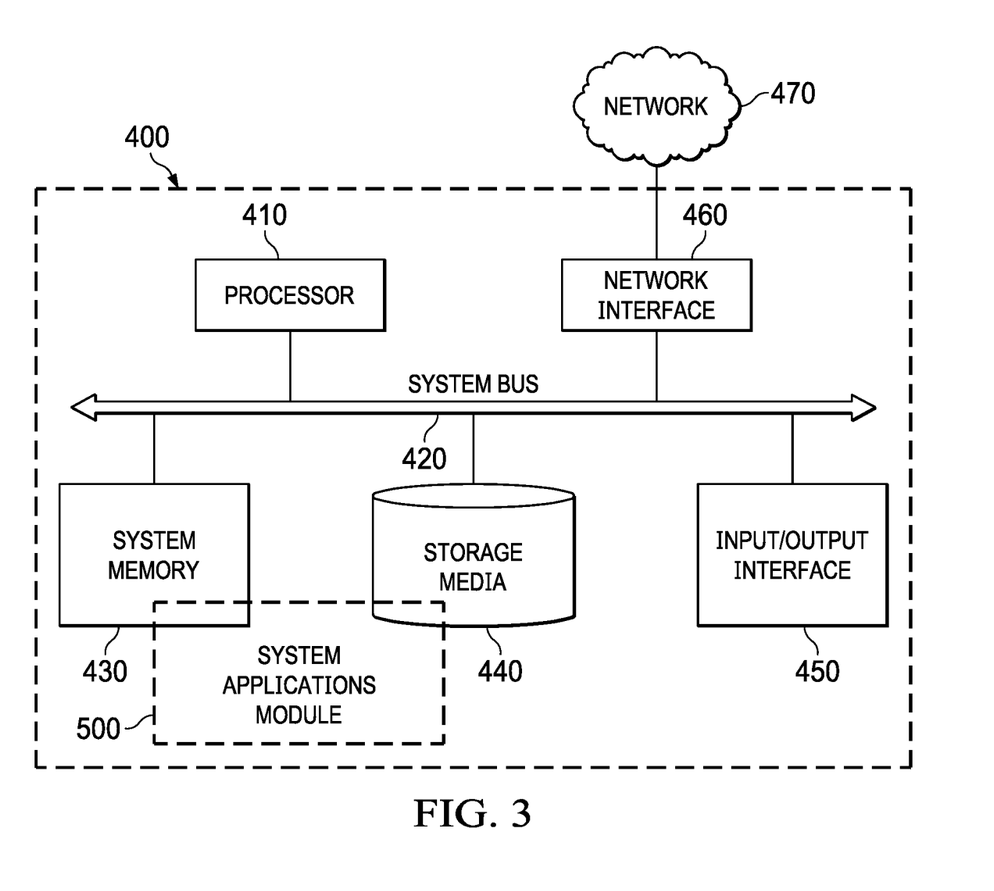
FIG. 3 is a block diagram depicting a computing machine and system applications, in accordance to certain example embodiments.

Referring now to FIG. 3, illustrated is a computing machine 400 and a system applications module 500, in accordance with example embodiments. The computing machine 400 can correspond to any of the various computers, mobile devices, laptop computers, servers, embedded systems, or computing systems presented herein. The module 500 can comprise one or more hardware or software elements, e.g., other OS application and user and kernel space applications, designed to facilitate the computing machine 400 in performing the various methods and processing functions presented herein. The computing machine 400 can include various internal or attached components such as a processor 410, system bus 420, system memory 430, storage media 440, input/output interface 450, and a network interface 460 for communicating with a network 470, e.g., a loopback, local network, wide-area network, cellular/GPS, Bluetooth, WIFI, and WIMAX.

The computing machine 400 can be implemented as a conventional computer system, an embedded controller, a laptop, a server, a mobile device, a smartphone, a wearable computer, a customized machine, any other hardware platform, or any combination or multiplicity thereof. The computing machine 400 can be a distributed system configured to function using multiple computing machines interconnected through a data network or bus system.

The processor 410 can be designed to execute code instructions in order to perform the operations and functionality described herein, manage request flow and address mappings, and to perform calculations and generate commands. The processor 410 can be configured to monitor and control the operation of the components in the computing machines. The processor 410 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 410 can be a single processing unit, multiple processing units, a single processing core, multiple processing cores, special purpose processing cores, co-processors, or any combination thereof. According to certain embodiments, the processor 410 along with other components of the computing machine 400 can be a software based or hardware based virtualized computing machine executing within one or more other computing machines.

The system memory 430 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 430 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 430. The system memory 430 can be implemented using a single memory module or multiple memory modules. While the system memory 430 is depicted as being part of the computing machine, one skilled in the art will recognize that the system memory 430 can be separate from the computing machine 400 without departing from the scope of the subject technology. It should also be appreciated that the system memory 430 can include, or operate in conjunction with, a non-volatile storage device such as the storage media 440.

The storage media 440 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 440 can store one or more operating systems, application programs and program modules, data, or any other information. The storage media 440 can be part of, or connected to, the computing machine. The storage media 440 can also be part of one or more other computing machines that are in communication with the computing machine such as servers, database servers, cloud storage, network attached storage, and so forth.

The applications module 500 and other OS application modules can comprise one or more hardware or software elements configured to facilitate the computing machine with performing the various methods and processing functions presented herein. The applications module 500 and other OS application modules can include one or more algorithms or sequences of instructions stored as software or firmware in association with the system memory 430, the storage media 440 or both. The storage media 440 can therefore represent examples of machine or computer readable media on which instructions or code can be stored for execution by the processor 410. Machine or computer readable media can generally refer to any medium or media used to provide instructions to the processor 410. Such machine or computer readable media associated with the applications module 500 and other OS application modules can comprise a computer software product. It should be appreciated that a computer software product comprising the applications module 500 and other OS application modules can also be associated with one or more processes or methods for delivering the applications module 500 and other OS application modules to the computing machine via a network, any signal-bearing medium, or any other communication or delivery technology. The applications module 500 and other OS application modules can also comprise hardware circuits or information for configuring hardware circuits such as microcode or configuration information for an FPGA or other PLD. In one exemplary embodiment, applications module 500 and other OS application modules can include algorithms capable of performing the functional operations described by the flow charts and computer systems presented herein.

The input/output ("I/O") interface 450 can be configured to couple to one or more external devices, to receive data from the one or more external devices, and to send data to the one or more external devices. Such external devices along with the various internal devices can also be known as peripheral devices. The I/O interface 450 can include both electrical and physical connections for coupling the various peripheral devices to the computing machine or the processor 410. The I/O interface 450 can be configured to communicate data, addresses, and control signals between the peripheral devices, the computing machine, or the processor 410. The I/O interface 450 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 450 can be configured to implement only one interface or bus technology. Alternatively, the I/O interface 450 can be configured to implement multiple interfaces or bus technologies. The I/O interface 450 can be configured as part of, all of, or to operate in conjunction with, the system bus 420. The I/O interface 450 can include one or more buffers for buffering transmissions between one or more external devices, internal devices, the computing machine, or the processor 420.

The I/O interface 420 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 420 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 400 can operate in a networked environment using logical connections through the NIC 460 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 410 can be connected to the other elements of the computing machine or the various peripherals discussed herein through the system bus 420. It should be appreciated that the system bus 420 can be within the processor 410, outside the processor 410, or both. According to some embodiments, any of the processors 410, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus comprising: at least one control unit for processing and storing operation variables for at least one engine driven pump; a rate control algorithm having an instruction set to read the operation variables for the at least one engine driven pump, the instruction set comprises a trained algorithmic model with a parameter space based on historical operation variables; the trained algorithmic model determines an optimal distribution rate based on an objective; the instruction set generates at least one rate control variable based on the determine optimal distribution rate, each rate control variable comprises a selected control unit identifier and a rate value; and the instruction set distributes each rate control variable based on the selected control unit identifier;

Clause 2, the apparatus of clause 1, wherein at least one control unit for processing and storing operation variables for at least one engine driven pump comprises at least one engine driven pump, at least one dual fuel engine driven pump, or any combination thereof;

Clause 3, the apparatus of clause 1, wherein the trained algorithmic model determine the optimal distribution rate using an objective that defines a desired mixture between a first fuel and a second fuel;

Clause 4, the apparatus of clause 3, wherein the trained algorithmic model determines the desired mixture between the first fuel and the second fuel using at least one control unit identifier, at least one operating value for each control unit identifier, and a subset of the historical operation variables;

Clause 5, the apparatus of clause 1, wherein the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment;

Clause 6, the apparatus of clause 1, wherein the historical operation variables comprises: a plurality of engine makes and models and for each make and model at least one engine emissions, at least one engine load range, at least one fluid end health, at least one split flow inputs, at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof;

Clause 7, the apparatus of clause 1, wherein the instruction set: identifies a make and a model of an engine; records dates of use of the engine, age of the engine at each date of use, and associated operation variables at each date of use; generates tag variables, each tag variable having a parameter and variable for describing the make and model of the engine, each date of use of the engine, age of the engine at each date of use, and associated operation variables at each date of use; and stores the tag variables in a training data set used for training algorithmic models;

Clause 8, the apparatus of clause 1, wherein the operation variables comprises an ambient temperature measurement, and the instruction generates the at least one rate control variable that restricts a minimum and maximum allowed rate for each engine driven pump or maximizes utilization of each engine driven pump;

Clause 9, a system comprising: at least one engine driven pump; at least one control unit for processing and storing operation variables for the at least one engine driven pump;

a rate control algorithm having an instruction set to read the operation variables for the at least one engine driven pump, the instruction set comprises a trained algorithmic model with a parameter space based on historical operation variables; the trained algorithmic model determines an optimal distribution rate based on an objective; the instruction set generates at least one rate control variable based on the determine optimal distribution rate, each rate control variable comprises a selected control unit identifier and a rate value; and the instruction set distributes each rate control variable based on the selected control unit identifier;

Clause 10, the system of clause 9, wherein at least one control unit for processing and storing operation variables for at least one engine driven pump comprises at least one engine driven pump, at least one dual fuel engine driven pump, or any combination thereof;

Clause 11, the system of clause 9, wherein the trained algorithmic model determine the optimal distribution rate using an objective that defines a desired mixture between a first fuel and a second fuel;

Clause 12, the system of clause 11, wherein the trained algorithmic model determines the desired mixture between the first fuel and the second fuel using at least one control unit identifier, at least one operating value for each control unit identifier, and a subset of the historical operation variables;

Clause 13, the system of clause 9, wherein the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment;

Clause 14, the system of clause 9, wherein the historical operation variables comprises: a plurality of engine makes and models and for each make and model at least one engine emissions, at least one engine load range, at least one fluid end health, at least one split flow inputs, at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof;

Clause 15, the system of clause 9, wherein the instruction set: identifies a make and a model of an engine; records dates of use of the engine, age of the engine at each date of use, and associated operation variables at each date of use; generates tag variables, each tag variable having a parameter and variable for describing the make and model of the engine, each date of use of the engine, age of the engine at each date of use, and associated operation variables at each date of use; and stores the tag variables in a training data set used for training algorithmic models;

Clause 16, the system of clause 9, wherein the operation variables comprises an ambient temperature measurement, and the instruction generates the at least one rate control variable that restricts a minimum and maximum allowed rate for each engine driven pump or maximizes utilization of each engine driven pump;

Clause 17, a method comprising: reading operation variables for at least one engine driven pump using a computer instruction set that comprises a trained algorithmic model with a parameter space based on historical operation variables; determining an optimal distribution rate based on an objective using the trained algorithmic model; generating at least one rate control variable based on the determine optimal distribution rate, each rate control variable comprises a selected control unit identifier and a rate value; and distributing each rate control variable based on the selected control unit identifier;

Clause 18, the method of clause 17, further comprises: running at least one engine driven pump; and processing and storing operation variables for the at least one engine driven pump;

Clause 19, the method of clause 17, wherein the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment; and Clause 20, the method of clause 17, wherein the historical operation variables comprises: a plurality of engine makes and models and for each make and model at least one engine emissions, at least one engine load range, at least one fluid end health, at least one split flow inputs, at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An apparatus comprising:
    at least one control unit for processing and storing operation variables for at least one engine driven pump;
    a rate control algorithm having an instruction set to read the operation variables for the at least one engine driven pump, the instruction set comprises a trained algorithmic model with a parameter space based on historical operation variables;
    the trained algorithmic model determines an optimal distribution rate based on an objective;
    the instruction set generates at least one rate control variable based on the determined optimal distribution rate, each rate control variable comprises a selected control unit identifier and a rate value; and
    the instruction set distributes each rate control variable based on the selected control unit identifier.

2. The apparatus of claim 1, wherein at least one control unit for processing and storing operation variables for at least one engine driven pump comprises at least one engine driven pump, at least one dual fuel engine driven pump, or any combination thereof.

3. The apparatus of claim 1, wherein the trained algorithmic model determines the optimal distribution rate using an objective that defines a desired mixture between a first fuel and a second fuel.

4. The apparatus of claim 3, wherein the trained algorithmic model determines the desired mixture between the first fuel and the second fuel using at least one control unit identifier, at least one operating value for each control unit identifier, and a subset of the historical operation variables.

5. The apparatus of claim 1, wherein the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment.

6. The apparatus of claim 1, wherein the historical operation variables comprises: a plurality of engine makes and models and for each make and model at least one engine emissions, at least one engine load range, at least one fluid end health, at least one split flow inputs, at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof.

7. The apparatus of claim 1, wherein the instruction set:
identifies a make and a model of an engine;
records dates of use of the engine, age of the engine at each date of use, and associated operation variables at each date of use;
generates tag variables, each tag variable having a parameter and variable for describing the make and model of the engine, each date of use of the engine, age of the engine at each date of use, and associated operation variables at each date of use; and
stores the tag variables in a training data set used for training algorithmic models.

8. The apparatus of claim 1, wherein the operation variables comprises an ambient temperature measurement, and the instruction generates the at least one rate control variable that restricts a minimum and maximum allowed rate for each engine driven pump or maximizes utilization of each engine driven pump.

9. A system comprising:
at least one engine driven pump;
at least one control unit for processing and storing operation variables for the at least one engine driven pump;
a rate control algorithm having an instruction set to read the operation variables for the at least one engine driven pump, the instruction set comprises a trained algorithmic model with a parameter space based on historical operation variables;
the trained algorithmic model determines an optimal distribution rate based on an objective;
the instruction set generates at least one rate control variable based on the determined optimal distribution rate, each rate control variable comprises a selected control unit identifier and a rate value; and
the instruction set distributes each rate control variable based on the selected control unit identifier.

10. The system of claim 9, wherein at least one control unit for processing and storing operation variables for at least one engine driven pump comprises at least one engine driven pump, at least one dual fuel engine driven pump, or any combination thereof.

11. The system of claim 9, wherein the trained algorithmic model determines the optimal distribution rate using an objective that defines a desired mixture between a first fuel and a second fuel.

12. The system of claim 11, wherein the trained algorithmic model determines the desired mixture between the first fuel and the second fuel using at least one control unit identifier, at least one operating value for each control unit identifier, and a subset of the historical operation variables.

13. The system of claim 9, wherein the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment.

14. The system of claim 9, wherein the historical operation variables comprises: a plurality of engine makes and models and for each make and model at least one engine emissions, at least one engine load range, at least one fluid end health, at least one split flow inputs, at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof.

15. The system of claim 9, wherein the instruction set:
identifies a make and a model of an engine;
records dates of use of the engine, age of the engine at each date of use, and associated operation variables at each date of use;
generates tag variables, each tag variable having a parameter and variable for describing the make and model of the engine, each date of use of the engine, age of the engine at each date of use, and associated operation variables at each date of use; and
stores the tag variables in a training data set used for training algorithmic models.

16. The system of claim 9, wherein the operation variables comprises an ambient temperature measurement, and the instruction generates the at least one rate control variable that restricts a minimum and maximum allowed rate for each engine driven pump or maximizes utilization of each engine driven pump.

17. A method comprising:
reading operation variables for at least one engine driven pump using a computer instruction set that comprises a trained algorithmic model with a parameter space based on historical operation variables;
determining an optimal distribution rate based on an objective using the trained algorithmic model;

generating at least one rate control variable based on the determined optimal distribution rate, each rate control variable comprises a selected control unit identifier and a rate value; and distributing each rate control variable based on the selected control unit identifier.

18. The method of claim 17, further comprises: running at least one engine driven pump; and processing and storing operation variables for the at least one engine driven pump.

19. The method of claim 17, wherein the operation variables are at least one selected from a group consisting of engine emission, engine load range, engine jacket water temperature, engine efficiency, pump efficiency, after treatment condition, fuel type, total fuel type consumption, total energy consumed, engine knock, critical engine fault code, split flow input, rate limitation from fluid velocity and proppant concentration, total pumps, pump used for standby, pump used for acid, fluid end health, fuel mixture ratio, ambient temperature measurement, first fuel intake temperature measurement, first fuel intake pressure measurement, a second fuel intake temperature measurement, a second fuel intake pressure measurement, a first fuel flow rate, a second fuel flow rate, a first fuel quality, a second fuel quality, water content of first fuel, water content of second fuel, a first air intake pressure measurement, a second air intake pressure measurement, a first air intake temperature measurement, a second air intake temperature measurement, total pump hours, total engine hours, pump hours during stimulation treatment, total engine hours during stimulation treatment, engine intake manifold temperature, and engine rpm during a stimulation treatment.

20. The method of claim 17, wherein the historical operation variables comprises: a plurality of engine makes and models and for each make and model at least one engine emissions, at least one engine load range, at least one fluid end health, at least one split flow inputs, at least one after treatment condition, at least one total pumps, at least one pump used for standby, at least one pump used for acid, at least one rate limitation from fluid velocity and proppant concentration, at least one critical engine fault codes, at least one engine jacket water temperature, at least one age of an associated engine, at least one engine knock, at least one age of an associated pump, at least one engine efficiency ratio, at least one pump efficiency ratio, at least one first fuel type, at least one total fuel type consumption, at least one total energy consumed, at least one second fuel type, at least one first fuel mixture ratio, at least one second fuel mixture ratio, at least one first fuel quality, at least one second fuel quality, at least one water content of first fuel, at least one water content of second fuel, at least one ambient temperature measurement, at least one first fuel intake temperature measurement, at least one first fuel intake pressure measurement, at least one second fuel intake temperature measurement, at least one second fuel intake pressure measurement, at least one first fuel flow rate, at least one second fuel flow rate, at least one first air intake pressure measurement, at least one second air intake pressure measurement, at least one first air intake temperature measurement, at least one second air intake temperature measurement, at least one total pump hours, at least one total engine hours, at least one total pump hours during stimulation treatment, at least one total engine hours during stimulation treatment, engine rpm during a stimulation treatment, engine intake manifold temperature, or any combination thereof.

\* \* \* \* \*